US006462896B1

(12) United States Patent
Codilian et al.

(10) Patent No.: US 6,462,896 B1
(45) Date of Patent: Oct. 8, 2002

(54) METHOD FOR MINIMIZING ADJACENT TRACK DATA LOSS DURING A WRITE OPERATION IN A DISK DRIVE

(75) Inventors: Raffi Codilian, Irvine; Donald R. Turner, Laguna Hills, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/728,627

(22) Filed: Nov. 30, 2000

(51) Int. Cl.$^7$ ................................................ G11B 5/09
(52) U.S. Cl. .............................. 360/48; 360/75; 360/60
(58) Field of Search ............................. 360/48, 75, 49, 360/60, 78.14

(56) References Cited

U.S. PATENT DOCUMENTS

| | | | | |
|---|---|---|---|---|
| 4,068,267 A | * | 1/1978 | Inouye | .................... 360/75 |
| 5,654,840 A | | 8/1997 | Patton et al. | |
| 5,923,487 A | * | 7/1999 | Carlson et al. | ............... 360/75 |
| 6,105,104 A | | 8/2000 | Guttman et al. | |

\* cited by examiner

Primary Examiner—Alan T. Faber

(74) Attorney, Agent, or Firm—Milad G. Shara, Esq.

(57) ABSTRACT

The present invention may be embodied in a method for minimizing adjacent track data loss due to a shock event occurring during a write operation in a disk drive. The method includes providing a plurality of adjacent concentric data tracks, for storage of user data, that are spaced-apart by a track pitch. The plurality of data tracks are allocated into a first set and a second set such that the data tracks of the first and second sets are interleaved physically with one another. A first series of logical block addresses are assigned to the first set of data tracks such that the first series of logical block addresses are consecutively numbered between successive ones of the first set of data tracks. A second series of logical block addresses, which consecutively follow the first series of logical block addresses, are assigned to the second set of data tracks such that the second series of logical block addresses are consecutively numbered between successive ones of the second set of data tracks. The assignment of logical block addresses to the first and second sets of data tracks results in the disk drive postponing writing to the second set of data tracks, thereby reducing data loss due to a shock event causing adjacent track encroachment occurring prior to writing to the second set of data tracks. The disk drive may postpone writing to the second set of data tracks by first writing user data to the data tracks of the first set until substantially all of the data tracks of the first set have been written with user data.

6 Claims, 5 Drawing Sheets

METHOD FOR MINIMIZING ADJACENT TRACK DATA LOSS DURING A WRITE OPERATION IN A DISK DRIVE

BACKGROUND OF THE INVENTION

1. Field of the Invention

The present invention relates to disk drives and more particularly to a technique for minimizing adjacent track data loss from a shock event during a write operation in a disk drive.

2. Description of the Prior Art

In order to remain competitive, disk drive manufacturers must continually provide increased storage capacity in a host system which stores data on the disk drive while rigidly controlling disk drive manufacturing cost. Host systems conventionally access disk drives via an operating system which views and fills the disk drive as a sequentially ordered string of logical blocks, each identified by a logical block address. Disk drives map the logical block addresses to sectors located on concentric tracks of one or more disks in the disk drive. Because host systems tend to perform a large number of accesses in sequential logical block order, disk drives conventionally map sequential logical block addresses to sequential tracks.

One key to increased storage capacity is increasing track density, often expressed as tracks per inch or TPI. Market demand for increased storage capacity has pushed disk drive designers to increase the TPI of disk drives, thereby increasing the likelihood that a shock event during a write operation may cause the read/write head to wander toward an adjacent track and write over data stored on the adjacent track.

Accordingly, there exists a need for a method that enables a disk drive to minimize adjacent track data loss resulting from a shock event during a write operation without unnecessarily increasing the disk drive's manufacturing cost.

SUMMARY OF THE INVENTION

The present invention may be embodied in a method for minimizing adjacent track data loss due to a shock event occurring during a write operation in a disk drive. The method includes providing a plurality of adjacent concentric data tracks, for storage of user data, that are spaced-apart by an inter-track distance. The plurality of data tracks is allocated into a first set and a second set such that the tracks of the first and second sets are interleaved physically with one another. A first series of logical block addresses are assigned to the first set of data tracks such that the first series of logical block addresses are consecutively numbered between successive ones of the first set of data tracks. A second series of logical block addresses, which consecutively follow the first series of logical block addresses, are assigned to the second set of data tracks such that the second series of logical block addresses are consecutively numbered between successive ones of the second set of data tracks. Because a host system stores data on a disk drive in a consecutive logical block sequence, the foregoing assignment of logical block addresses to the first and second sets of data tracks results in the disk drive postponing writing to the second set of data tracks, thereby reducing data loss due to a shock event causing adjacent track encroachment occurring prior to writing to the second set of data tracks.

Further, each data track of the first set may be separated from another data track of the first set by one data track of the second set. Also, the disk drive may postpone writing to the second set of data tracks by first writing user data to the data tracks of the first set until substantially all of the data tracks of the first set have been written with user data.

Additionally, the step of assigning a first series of logical block addresses may include assigning the logical block addresses starting from an inner-most data track of the first set to an outer-most data track of the first set and the step of assigning a second series of logical block addresses comprises assigning the logical block addresses from an outer-most data track of the second set to an inner-most data track of the second set. Alternatively, the first series of logical block addresses may be assigned starting from an outer-most data track of the first set to an inner-most data track of the first set and the second series of logical block addresses may be assigned from an inner-most data track of the second set to an outer-most data track of the second set.

Another embodiment of the invention may reside in a method of minimizing adjacent track data loss from shock events occurring during host write operations. The method may include providing a plurality of adjacent concentric cylinders that are spaced-apart by a distance and that each includes at least one data track designated for storage of user data. The plurality of cylinders may be allocated into a first set and a second set such that the cylinders of the first and second sets are interleaved physically with one another. A first series of consecutively numbered logical block addresses may be assigned to the first set of cylinders such that the first series of logical block addresses are associated with data tracks of the first set of cylinders. A second series of consecutively numbered logical block addresses, which consecutively follow the first series of logical block addresses, may be assigned to the second set of cylinders such that the second series of logical block addresses are associated with data tracks of the second set of cylinders. A host system generally initially writes data associated with the first series of logical block addresses and postpones writing data associated with the second series of logical block addresses, until data has been written which is associated with substantially all of the first series of logical block addresses. Thus, the logical block address allocation to the first and second sets of cylinders results in minimizing loss of user data due to shock events causing adjacent track encroachment during host write operations occurring prior to writing user data to the data tracks of the second set of cylinders.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
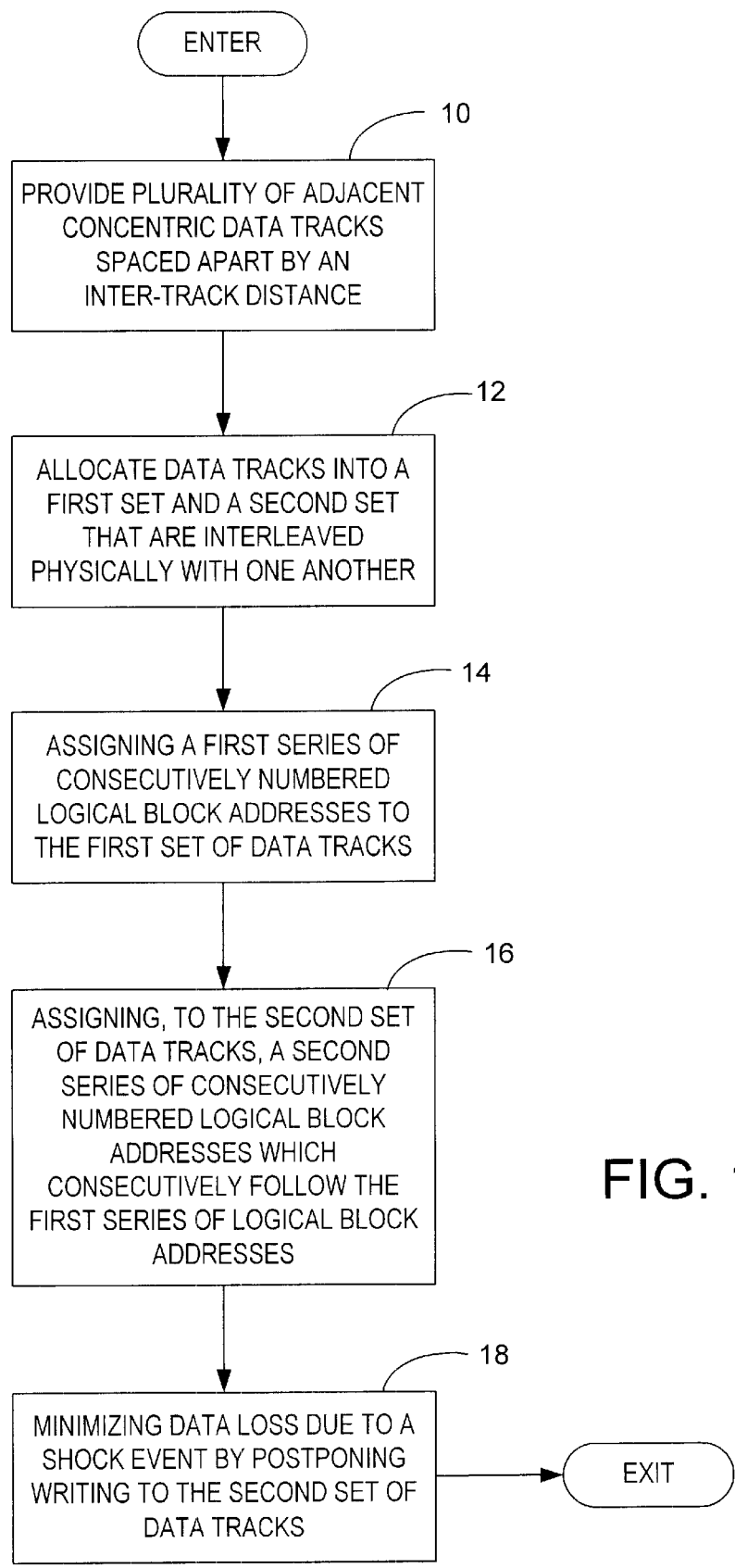
FIG. 1 is a flow diagram illustrating a method for minimizing adjacent track data loss during a write operation in a disk drive, according to the present invention.
Figure 2:
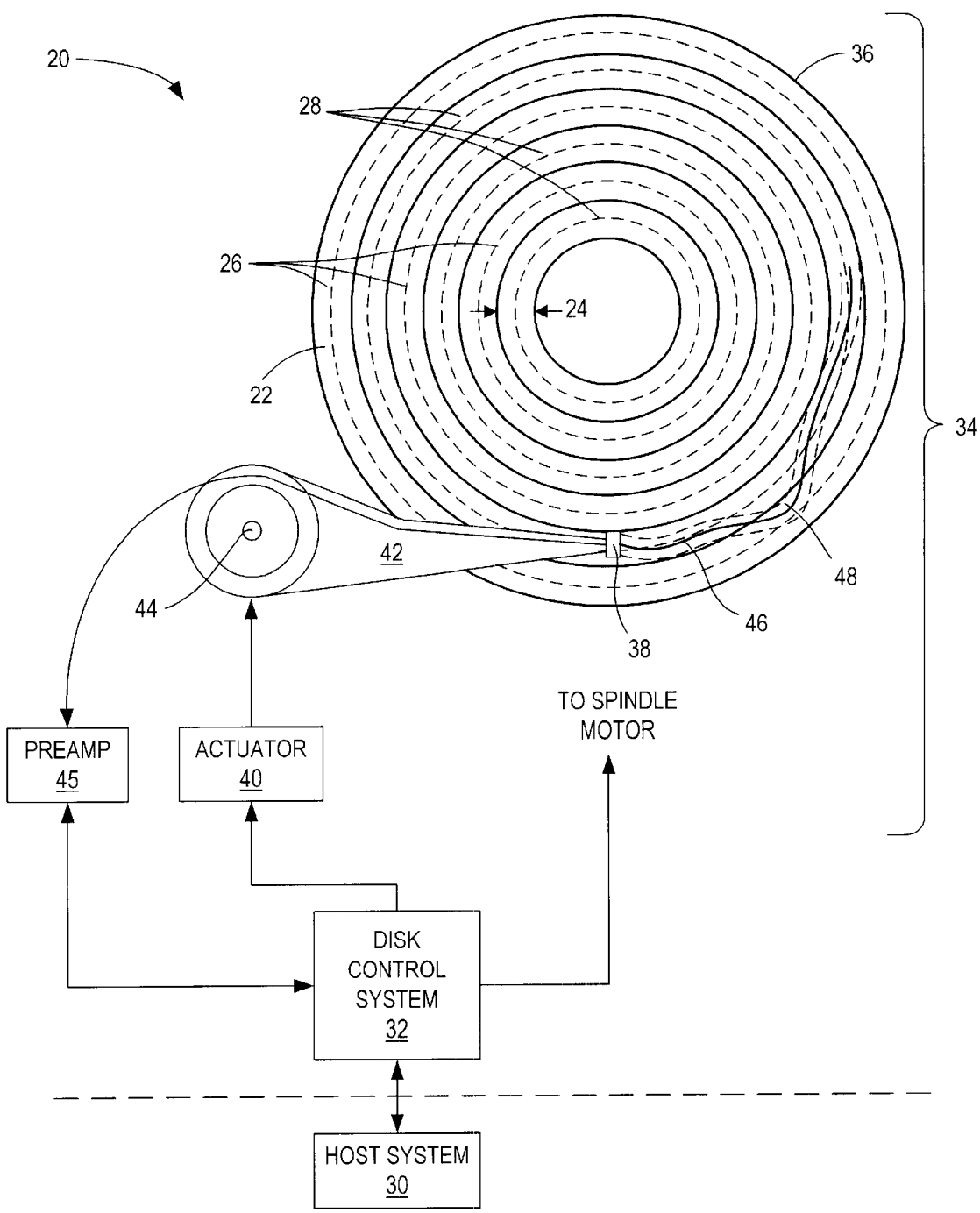
FIG. 2 is a block diagram of a disk drive for minimizing adjacent track data loss during a write operation according to the method of FIG. 1.

With reference to FIGS. 1 and 2, the present invention may be embodied in a method (FIG. 1) for minimizing adjacent track data loss due to a shock event occurring during a write operation in a disk drive 20 (FIG. 2). The method includes providing a plurality of adjacent concentric data tracks 22, for storage of user data, that are spaced-apart by a distance 24 (step 10). The plurality of data tracks are allocated into a first set 26 and a second set 28 such that the tracks of the first and second sets are interleaved physically with one another (step 12). A first series of logical block addresses are assigned to the first set of data tracks such that the first series of logical block addresses are consecutively numbered between successive ones of the first set of data tracks (step 14). A second series of logical block addresses, which consecutively follow the first series of logical block addresses, are assigned to the second set of data tracks such that the second series of logical block addresses are consecutively numbered between successive ones of the second set of data tracks (step 16). The assignment of logical block addresses to the first and second sets of data tracks results in the disk drive postponing writing to the second set of data tracks as a host system 30, by convention, initially fills the drive (stores data) in consecutive logical block order, thereby reducing data loss due to a shock event causing adjacent track encroachment occurring prior to writing to the second set of data tracks (step 18).

The disk drive 20 generally comprises a disk control system 32 and a head disk assembly (HDA) 34. The HDA includes a magnetic disk 36 having the plurality of concentric data tracks 22 recorded thereon, a head 38 for writing user data to or reading user data from a selected one of the data tracks in response to host command during a user operation of the disk drive, and an actuator 40 for positioning the head over the selected track. The head 38 in present disk drives comprises a giant magneto-resistive (GMR) read element and thin film inductive write element. The actuator is typically implemented as a voice coil motor (VCM) which rotates an actuator arm 42 about a pivot 44 in order to position the head radially over the disk in response to control signals from the disk control system.

In addition to the disk 36 and the actuator 40, the HDA 34 includes a preamplifier 45 and a spindle motor (not shown) for rotating the disk 36. The head 38 communicates with disk control system via the preamplifier. The disk control system also includes circuitry and processors that provide an intelligent disk control system interface between a host system 30 and the HDA 34 for execution of read and write commands.

The disk control system 32 causes the head 38 to follow the centerline of the selected track in an operation generally referred to as "track following." During track following, the path 46 of the head wanders about the track centerline. Typically, the head wander is within a predetermined range defined by a "Track Misregistration" (TMR) budget. However, a sudden shock of sufficient force may cause an encroachment 48 of the head into an adjacent track. If the encroachment occurs during a data write operation, user data previously written in the adjacent track may be partially or totally over-written and irretrievably lost. However, an encroachment by the head over an adjacent data track which is not storing user data may not cause an irretrievable loss of user data.

A high capacity disk drive 20 often has a substantial portion of its storage capacity that is not used for a long time period after the disk drive is installed in the host system 30. The present invention takes advantage of the unused storage capacity to minimizing adjacent track data loss due to a shock event occurring during a write operation by using data tracks 22 associated with the unused storage capacity as physical buffers between the data tracks storing user data.

Figure 3:
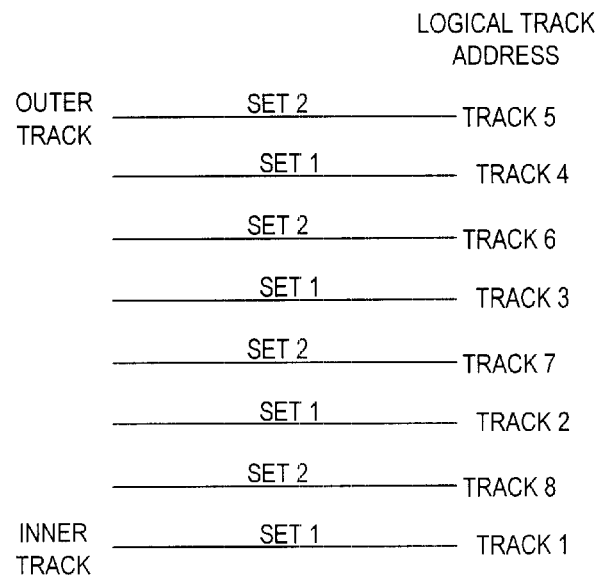
FIG. 3 is a schematic diagram illustrating a first embodiment of data tracks having representative logical block address assignments according to the present invention.
Figure 4:
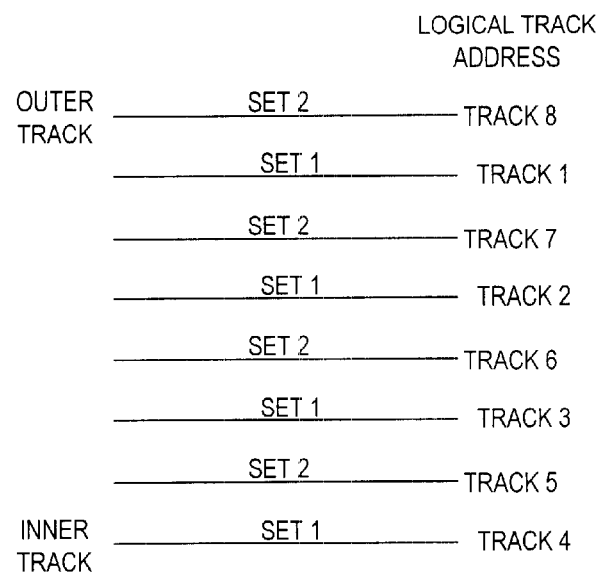
FIG. 4 is a schematic diagram illustrating a second embodiment of data tracks having representative logical block address assignments according to the present invention.

With reference to FIG. 3, the data tracks 22 are allocated to a first set 26 or to a second set 28. Each data track of the first set is separated from another data track of the first set by one data track of the second set. A first series of logical block addresses (1–4) are assigned starting from an inner-most data track (track 1) of the first set to an outer-most data track (track 4) of the first set. A second series of logical block addresses (5–8), which consecutively follow the first series of consecutive addresses, are assigned from an outer-most data track (track 5) of the second set to an inner-most data track (track 8) of the second set. Alternatively, as shown in FIG. 4, the first series of logical block addresses (1–4) may be assigned starting from an outermost data track (track 1) of the first set to an inner-most data track (track 4) of the first set and the second series of logical block addresses (58) may be assigned from an inner-most data track (track 5) of the second set to an outer-most data track (track 8) of the second set. As a consequence of the first and second sets, 26 and 28, being physically interleaved, the physical data tracks 1 and 3, for example, are non-adjacent tracks of the first set separated from each other by the data track 8 of the second set (FIG. 3). Accordingly, the physical tracks 1 and 3 would preferably correspond to logical tracks 1 and 2 having data sequenced accordingly.

The disk drive may postpone writing to the second set 28 of data tracks by first writing user data to the data tracks of the first set 26 until substantially all of the data tracks of the first set have been written with user data. By using the manner of logical track address assignment shown in FIGS. 3 or 4, the disk drive control system 32 can maintain a sequential writing of data on the disk and postpone usage of the tracks of the second set.

Figure 5:
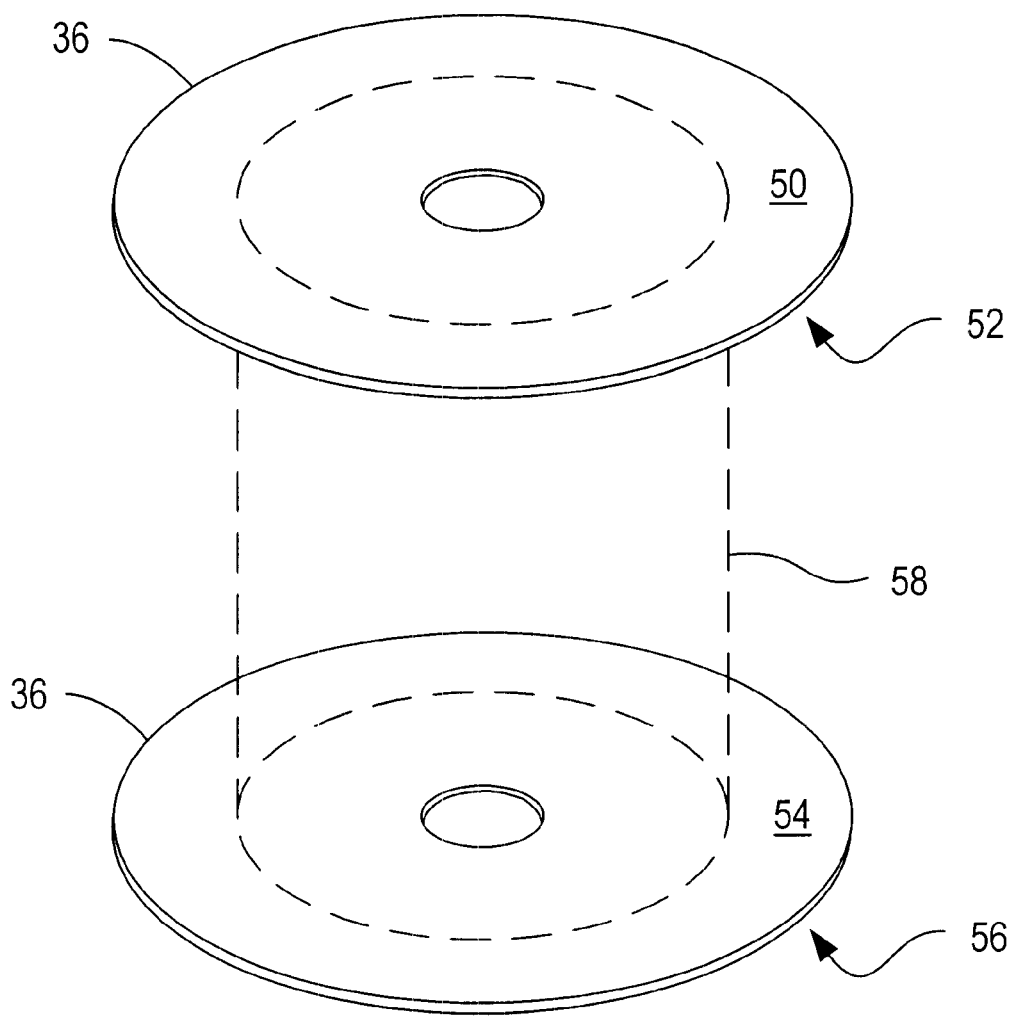
FIG. 5 is a schematic diagram illustrating a cylinder of data tracks.
Figure 6:
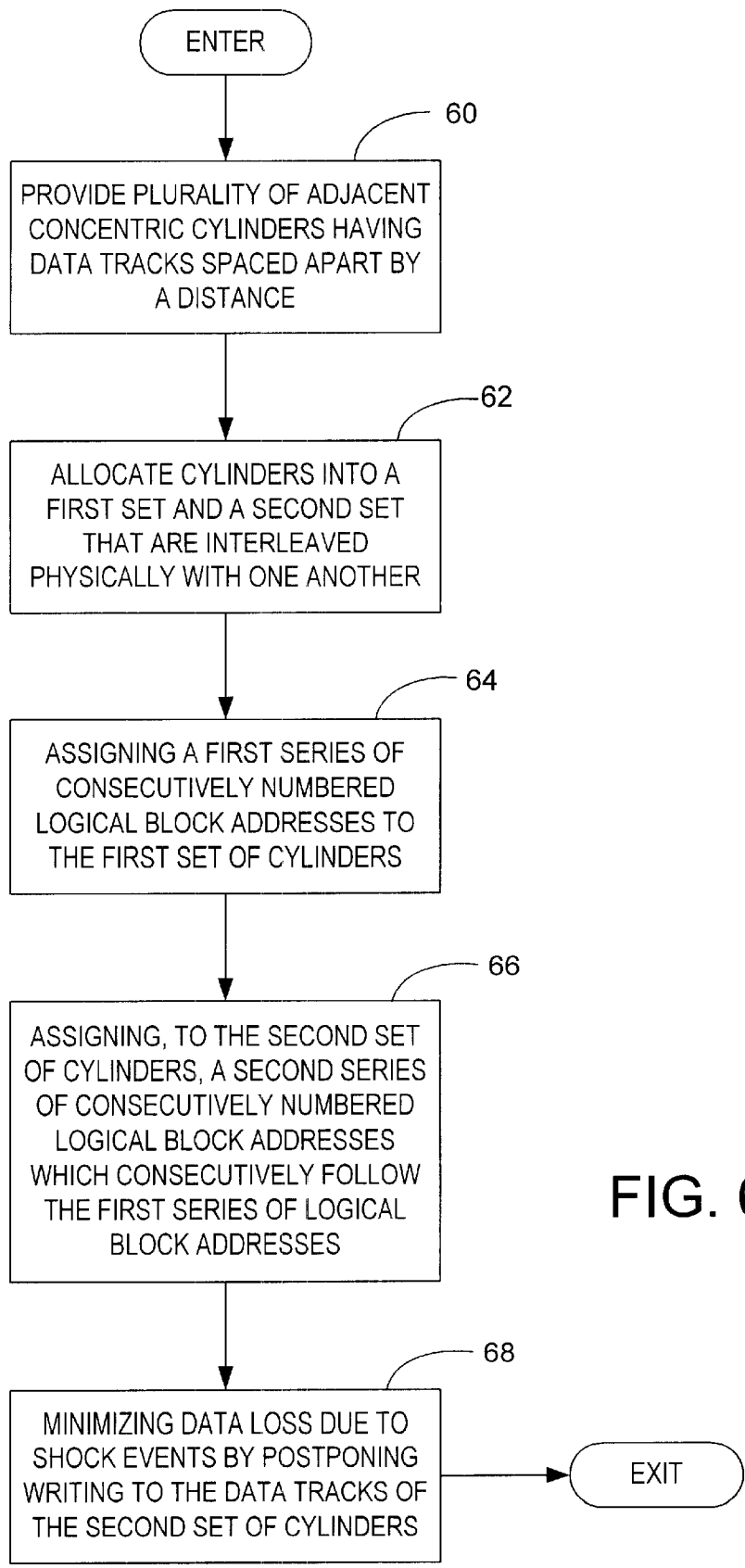
FIG. 6 is a flow diagram of an alternative embodiment of a method for minimizing adjacent track data loss, according to the present invention.

With reference to FIGS. 5 and 6, an alternative embodiment of the invention may reside in a method for minimizing adjacent rack data loss in a disk drive 20 having a plurality of magnetic disk surfaces, 50, 52, 54, and 56. The position of a particular data track 22 on a surface may be referenced by a track number which is numbered according to its radial position on the disk surface. The data tracks on the plurality of disk surfaces are generally located at corresponding radial positions and the term "cylinder" (element 58 in FIG. 5) is used to reference the same relative track location on the plurality of disk surfaces.

The method may include providing a plurality of adjacent concentric cylinders 58 that are spaced-apart by a distance and that each includes at least one data track 22 designated for storage of user data (step 60). The plurality of cylinders may be allocated into a first set and a second set such that the cylinders of the first and second sets are interleaved physically with one another (step 62). A first series of consecutively numbered logical block addresses may be assigned to the first set of cylinders such that the first series of logical block addresses are associated with data tracks of the first set of cylinders (step 64). A second series of consecutively numbered logical block addresses, which consecutively follow the first series of logical block addresses, may be assigned to the second set of cylinders such that the second series of logical block addresses are associated with data tracks of the second set of cylinders (step 66). Within each set of cylinders, the consecutively numbered logical block addresses may be assigned in a horizontal manner across each disk surface before stepping to a next surface, vertically along each cylinder before stepping to a next cylinder, on in a "serpentine" manner across the disk surfaces and along the cylinders in an optimized path.

A host system 30 generally initially writes data associated with the first series of logical block addresses and postpones writing data associated with the second series of logical block addresses, until data has been written which is associated with substantially all of the first series of logical block addresses. Thus, the logical block address allocation to the first and second sets of cylinders 58 results in minimizing loss of user data due to shock events causing adjacent track encroachment during host write operations occurring prior to writing user data to the data tracks 22 of the second set of cylinders (step 68).

We claim:

1. A method for minimizing adjacent track data loss due to a shock event occurring during a write operation in a disk drive, the method comprising:

providing a plurality of adjacent concentric data tracks wherein the data tracks are spaced-apart by a distance and each data track is designated for storage of user data;

allocating the plurality of data tracks into a first set and a second set wherein the data tracks of the first and second sets are interleaved physically with one another;

assigning a first series of logical block addresses to the first set of data tracks such that the first series of logical block addresses are consecutively numbered between successive ones of the first set of data tracks;

assigning a second series of logical block addresses, which consecutively follow the first series of logical block addresses, to the second set of data tracks such that the second series of logical block addresses are consecutively numbered between successive ones of the second set of data tracks;

wherein the assignment of logical block addresses to the first and second sets of data tracks results in the disk drive postponing writing to the second set of data tracks, thereby minimizing data loss due to a shock event that causes adjacent track encroachment occurring prior to writing to the second set of data tracks.

2. A method for minimizing adjacent track data loss as defined in claim 1, wherein each data track of the first set is separated from another data track of the first set by one data track of the second set.

3. A method for minimizing adjacent track data loss as defined in claim 1, wherein the step of assigning a first series of logical block addresses comprises assigning the logical block addresses starting from an inner-most data track of the first set to an outer-most data track of the first set and the step of assigning a second series of logical block addresses comprises assigning the logical block addresses from an outer-most data track of the second set to an inner-most data track of the second set.

4. A method for minimizing adjacent track data loss as defined in claim 1, wherein the step of assigning a first series of logical block addresses comprises assigning the logical block addresses starting from an outer-most data track of the first set to an inner-most data track of the first set and the step of assigning a second series of logical block addresses comprises assigning the logical block addresses from an inner-most data track of the second set to an outer-most data track of the second set.

5. A method for minimizing adjacent track data loss as defined in claim 1, wherein the disk drive postpones writing to the second set of data tracks by first writing user data to the data tracks of the first set until substantially all of the data tracks of the first set have been written with user data.

6. A method of minimizing adjacent track data loss from shock events occurring during host write operations in a disk drive, the method comprising:

providing a plurality of adjacent concentric cylinders wherein the cylinders are spaced-apart by a distance and each cylinder includes at least one data track designated for storage of user data;

allocating the plurality of cylinders into a first set and a second set wherein the cylinders of the first and second sets are interleaved physically with one another;

assigning a first series of consecutively numbered logical block addresses to the first set of cylinders such that the first series of logical block addresses are associated with data tracks of the first set of cylinders; and assigning a second series of consecutively numbered logical block addresses, which consecutively follow the first series of logical block addresses, to the second set of cylinders such that the second series of logical block addresses are associated with data tracks of the second set of cylinders;

wherein a host system generally initially writes data associated with the first series of logical block addresses and postpones writing data associated with the second series of logical block addresses, until data has been written which is associated with substantially all of the first series of logical block addresses, so that the logical block address allocation to the first and second sets of cylinders results in minimizing loss of user data due to shock events causing adjacent track encroachment during host write operations occurring prior to writing user data to the data tracks of the second set of cylinders.

* * * * *